United States Patent
Mazo (10) Patent No.: US 8,135,757 B2
(45) Date of Patent: Mar. 13, 2012

(54) GENERATING REFERENCES TO REUSABLE CODE IN A SCHEMA

(75) Inventor: Gary Isaak Mazo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/482,436

(22) Filed: Jun. 10, 2009

(65) Prior Publication Data

US 2010/0318574 A1  Dec. 16, 2010

(51) Int. Cl.
*G06F 17/30* (2006.01)
(52) U.S. Cl. ........ 707/807; 707/791; 707/802; 717/114; 703/13
(58) Field of Classification Search .................. None
See application file for complete search history.

(56) References Cited

U.S. PATENT DOCUMENTS

| | | | |
|---|---|---|---|
| 5,864,862 A * | 1/1999 | Kriens et al. ...................... 1/1 |
| 5,890,183 A * | 3/1999 | Fujimoto ...................... 715/236 |
| 6,904,598 B2 * | 6/2005 | Abileah et al. ................ 719/319 |
| 6,910,216 B2 * | 6/2005 | Abileah et al. ................ 719/319 |
| 6,912,719 B2 * | 6/2005 | Elderon et al. ................ 719/319 |
| 6,948,174 B2 * | 9/2005 | Chiang et al. ................. 719/319 |
| 6,964,053 B2 * | 11/2005 | Ho et al. ........................ 719/319 |
| 7,051,299 B2 * | 5/2006 | Chadha et al. ................. 716/106 |
| 7,275,079 B2 * | 9/2007 | Brodsky et al. ............... 709/203 |
| 7,440,958 B2 | 10/2008 | Poole et al. |
| 7,559,066 B2 * | 7/2009 | Ho et al. ....................... 719/330 |
| 2003/0005410 A1 * | 1/2003 | Harless ......................... 717/114 |
| 2004/0268371 A1 | 12/2004 | Carrell et al. |
| 2005/0071756 A1 * | 3/2005 | Cipresso et al. .............. 715/513 |
| 2005/0155016 A1 | 7/2005 | Bender |
| 2006/0064666 A1 | 3/2006 | Amaru et al. |
| 2006/0282820 A1 * | 12/2006 | Lee ............................... 717/114 |
| 2007/0156737 A1 | 7/2007 | Barnes |
| 2008/0155557 A1 | 6/2008 | Bezrukov et al. |

(Continued)

OTHER PUBLICATIONS

Bea Systems, "Understanding How JAM Uses XML", [online], 2001, [Retrieved on Jun. 10, 2009]. Retrieved from the Internet at <URL: http://edocs.bea.com/elink/elinkjam/v411.jamug/sml.htm>, 6 pp.

(Continued)

*Primary Examiner* — Hung Le
(74) *Attorney, Agent, or Firm* — David W. Victor; Konrad Raynes & Victor LLP (57) ABSTRACT

Provided are a method, system, and computer program product to generate references to reusable code in a schema. A program is coded in a first programming language having data structures, wherein at least one of the data structures includes a reference to reusable code. A model file is generated providing a source name identifying the reusable code, elements and attributes in a second programming language for the reference to the reusable code in the program. A generator is invoked with a reference to the model file. The invoked generator processes the data structure coded in the first programming language to generate a data structure schema in the computer readable medium in a second programming language describing elements and attributes of the data structure coded in the first programming language. A determination is made of instances of the source name indicated in the model file in the data structure. For the determined instances of the source name in the data structure, a reference in the data structure schema to the reusable code identified by the source name is generated, wherein the reference generated in the data structure schema includes the element and attribute information indicated in the model file.

25 Claims, 10 Drawing Sheets

U.S. PATENT DOCUMENTS

| | | | |
|---|---|---|---|
| 2008/0250434 A1 | 10/2008 | Ho et al. | |
| 2008/0270433 A1 | 10/2008 | Poole et al. | |
| 2009/0113401 A1 | 4/2009 | Cipresso et al. | |
| 2009/0172314 A1* | 7/2009 | Gabor | 711/156 |
| 2010/0106705 A1* | 4/2010 | Rush et al. | 707/709 |
| 2010/0131565 A1* | 5/2010 | Weinberg et al. | 707/802 |

OTHER PUBLICATIONS

Hildner, J., "B41 WebSphere Enterprise Developer and IBM Debug Tool for z/OS", IBM Corporation 2004, 31 pp.

IBM Corp., "Batch Processor", [online], 205, 2007, [Retrieved on May 14, 2009]. Retrieved from the Internet at <URL: http://publib.boulder.ibm.com/infocenter/ratdevz/v7r1m1/topic/com.ibm.e...>, 2 pp.

IBM Corp., "CICS Transaction Server for z/OS: Web Services Guide", Version 3, Release 2, IBM Corp., 2005, 2008, 319 pp.

IBM Corp., "DFHLS2WS: High-Level Language to WSDL Conversion", [online], [Retrieved on Jun. 10, 2009], Last updated: Apr. 21, 2009. Retrieved from the Internet at <URL: http://publib.boulder.ibm.com/infocenter/cicsts/v3r2/index.jsp?topic=/com.ibm.cics.ts.webservices.doc/reference/dfhws_ls2ws.html>, 7 pp.

IBM Corp., "Enterprise Service Tools for Web Services & SOA Single-Service Projects", First Edition (Jun. 2008), IBM Rational Developer for System z Version 7.1.1, IBM Corp., 2007-2008, 352 pp.

IBM Corp., "Service Specification.XML", [online], 2005, 2007, [Retrieved on May 14, 2009]. Retrieved from the Internet at <URL: http://publib.boulder.ibm.com/infocenter/ratdevz/v7r1m1/topic/com.ibm.e...>, 4 pp.

IBM Corp., "XML to COBOL Mapping Reference", [online], 2005, 2007, [Retrieved on Jun. 10, 2009]. Retrieved from the Internet at <URL: http://publib.boulder.ibm.com/infocenter/ratdevz/v7r1m1/topic/com.ibm.e...>, 1 p.

Barosa, R., S.K. Bose, S. Davis, J. Hamilton, J. Kaltenbach, D. Lawrence, V. Quiblier, Z. Shen, M. Terwagne, & K. Yoshimura, "Topics on Version 7 of IBM Rational Developer for System z and IBM WebSphere Developer for System z", Redbooks, First Edition (Feb. 2009), IBM Corp. 2009, 338 pp (Part A).

Barosa, R., S.K. Bose, S. Davis, J. Hamilton, J. Kaltenbach, D. Lawrence, V. Quiblier, Z. Shen, M. Terwagne, & K. Yoshimura, "Topics on Version 7 of IBM Rational Developer for System z and IBM WebSphere Developer for System z", Redbooks, First Edition (Feb. 2009), IBM Corp. 2009, 169 pp (Part B).

Barosa, R., S.K. Bose, S. Davis, J. Hamilton, J. Kaltenbach, D. Lawrence, V. Quiblier, Z. Shen, M. Terwagne, & K. Yoshimura, "Topics on Version 7 of IBM Rational Developer for System z and IBM WebSphere Developer for System z", Redbooks, First Edition (Feb. 2009), IBM Corp. 2009, 169 pp (Part C).

Schemaware LLC., "Schema Ware", [online], 2003, [Retrieved on Jun. 10, 2009]. Retrieved from the Internet at <URL: http://www.schemaware.com/mapper_xml.htm>, 2 pp.

Softproject, "COBOL Copybook Toolkit for Java: Developer Guide", Version 1.2, © 2002-2005 SoftProject, 25 pp.

Sourceforge, Inc., "CB2XML", [online], 1999-2009, [Retrieved on Jun. 10, 2009]. Retrieved from the Internet at <URL: http://cb2xml.sourceforge.net/>, 1 p.

\* cited by examiner

```
01 departmentUpdateRequest.
    COPY COMMHDR.
    COPY DEPTBDY.

01 departmentUpdateReply.
    COPY COMMHDR.
    02 updStatus pic xxx.
```

FIG. 1A
PRIOR ART

```
05 commHeader.
    10 commId              PIC 9 (4).
    10 commRevDate         PIC X (8).
    10 commDigest          PIC X (40).
```

```
<schema ...
targetNamespace="http://www.TST01I.com/schemas/TST01IInterface"
xmlns="http://www.w3.org/2001/XMLSchema"
xmlns:cbl="http://www.TST01I.com/schemas/TST01IInterface">
    <complexType name="departmentUpdateRequest">
      <sequence>
        <element name="commHeader"
type="cbl:departmentupdaterequest_commheader"/>
        <element form="qualified" name="member_count">
          <simpleType>
            ...
          </simpleType>
        </element>
        <element name="dept_details"
type="cbl:departmentupdaterequest_dept__details"/>
      </sequence>
    </complexType>
    <complexType name="departmentupdaterequest_commheader">
      <sequence>
        <element form="qualified" name="commId">
          <simpleType>
            ...
          </simpleType>
        </element>
        <element form="qualified" name="commRevDate">
          <simpleType>
            ...
          </simpleType>
        </element>
        <element form="qualified" name="commDigest">
          <simpleType>
            ...
          </simpleType>
        </element>
      </sequence>
    </complexType>
    <complexType name="departmentupdaterequest_dept__details">
      <sequence>
        ...
      </sequence>
    </complexType>
    <element name="departmentUpdateRequest"
type="cbl:departmentUpdateRequest">
```

6 — xmlns:cbl="http://www.TST01I.com/schemas/TST01IInterface">

2 — type="cbl:departmentupdaterequest_commheader"/>

```
<schema attributeFormDefault="qualified" elementFormDefault="qualified"
targetNamespace="http://www.TST010.com/schemas/TST010Interface"
xmlns="http://www.w3.org/2001/XMLSchema"
xmlns:cbl="http://www.TST010.com/schemas/TST010Interface" >
  <complexType name="departmentUpdateReply" >
    <sequence>
      <element name="commHeader" type="cbl:departmentupdatereply_commheader"/
>
      <element form="qualified" name="updStatus" >
      ...
      </element>
    </sequence>
  </complexType>
  <complexType name="departmentupdatereply_commheader" >
    <sequence>
      <element form="qualified" name="commId" >
      ...
      </element>
      <element form="qualified" name="commRevDate" >
      ...
      </element>
      <element form="qualified" name="commDigest" >
      ...
      </element>
    </sequence>
  </complexType>
  <element name="employeeUpdateRequest" type="cbl:departmentUpdateReply" >
  ...
  </element>
</schema>
```

```
<?xml version="1.0" encoding="UTF-8"?>
<commtypes:CommonTypes xmlns:commtypes="http://
www.ibm.com/xmlent/commxsd/emf/commtypes">
  <commtypes:CommGroup lang="COBOL" format="fixed">
    <commtypes:CommonType
      srcName="COMMHDR"
      nativeName="commHeader"
      commSchemaLocation="commHeader.xsd"
      commNamespace="http://www.sample.com/
      schemas/commHeader"
      xmlElementName="commHeader"
      commNsPrefix="hdr1"
    />
  </commtypes:CommGroup>
</commtypes:CommonTypes>
```

FIG. 6
Model File (CommTypeFIle.xml)

```
<?xml version="1.0" encoding="UTF-8"?>
<xsd:schema xmlns:xsd="http://www.w3.org/2001/XMLSchema" xmlns:commtypes="http://www.ibm.com/
xmlent/commxsd/emf/commtypes" targetNamespace="http://www.ibm.com/xmlent/commxsd/emf/
commtypes">
  <xsd:element name="CommGroup">
    <xsd:complexType>
      <xsd:sequence>
        <xsd:element ref="commtypes:CommonType" minOccurs="1" maxOccurs="unbounded"/>
      </xsd:sequence>
      <xsd:attribute name="lang" type="xsd:string"/>
      <xsd:attribute name="format" type="xsd:string"/>
    </xsd:complexType>
  </xsd:element>
  <xsd:element name="CommonTypes">
    <xsd:complexType>
      <xsd:sequence>
        <xsd:element ref="commtypes:CommGroup"/>
      </xsd:sequence>
    </xsd:complexType>
  </xsd:element>
  <xsd:element name="CommonType">
    <xsd:complexType>
      <xsd:attribute name="srcName" type="xsd:string"/>
      <xsd:attribute name="xmlElementName" type="xsd:string"/>
      <xsd:attribute name="nativeName" type="xsd:string"/>
      <xsd:attribute name="commSchemaLocation" type="xsd:string"/>
      <xsd:attribute name="commNamespace" type="xsd:string"/>
      <xsd:attribute name="commNsPrefix" type="xsd:string"/>
    </xsd:complexType>
  </xsd:element>
</xsd:schema>
```

Comm Type Metamodel    FIG. 7

FIG. 8

```
<schema attributeFormDefault="qualified" elementFormDefault="qualified"
    targetNamespace="http://www.TST01I.com/schemas/TST01IInterface"
    xmlns="http://www.w3.org/2001/XMLSchema"
    xmlns:cbl="http://www.TST01I.com/schemas/TST01IInterface"
    xmlns:hdr1="http://www.sample.com/schemas/commHeader">
  <import namespace="http://www.sample.com/schemas/commHeader"
          schemaLocation="commHeader.xsd"/>
  <complexType name="departmentUpdateRequest">
    <sequence>
      <element ref="hdr1:commHeader"/>
      <element form="qualified" name="member_count">
        <simpleType>
          <restriction base="int">
            <minInclusive value="0"/>
            <maxInclusive value="999999999"/>
          </restriction>
        </simpleType>
      </element>
      <element name="dept_details"
 type="cbl:departmentupdaterequest_dept__details"/>
    </sequence>
  </complexType>
```

200 points to the import/schema section.

DEPTURQ.XSD

FIG. 9

```
<schema attributeFormDefault="qualified" elementFormDefault="qualified"
        targetNamespace="http://www.TST010.com/schemas/TST010Interface"
        xmlns="http://www.w3.org/2001/XMLSchema"
        xmlns:cbl="http://www.TST010.com/schemas/TST010Interface"
        xmlns:hdr1="http://www.sample.com/schemas/commHeader">
  <import namespace="http://www.sample.com/schemas/commHeader"
          schemaLocation="commHeader.xsd"/>
  <complexType name="departmentUpdateReply">
    <sequence>
      <element ref="hdr1:commHeader"/>
      <element form="qualified" name="updStatus">
        <annotation>
          <appinfo source="http://www.wsadie.com/appinfo">
            <initialValue kind="SPACE"/>
          </appinfo>
        </annotation>
        <simpleType>
          <restriction base="string">
            <maxLength value="3"/>
          </restriction>
        </simpleType>
      </element>
    </sequence>
  </complexType>
  <element name="departmentUpdateReply" type="cbl:departmentUpdateReply"/>
</schema>
```

202 → `<import namespace="http://www.sample.com/schemas/commHeader" schemaLocation="commHeader.xsd"/>`

DEPTURP.XSD

FIG. 10

```xml
<?xml version="1.0" encoding="UTF-8"?>
<schema attributeFormDefault="qualified" elementFormDefault="qualified"
targetNamespace="http://www.sample.com/schemas/commHeader" xmlns="http://
www.w3.org/2001/XMLSchema" xmlns:cbl="http://www.sample.com/schemas/
commHeader">
  <complexType name="commheader">
    <sequence>
      <element name="commId">
        <simpleType>
          <restriction base="short">
            <minInclusive value="0"/>
            <maxInclusive value="9999"/>
          </restriction>
        </simpleType>
      </element>
      <element name="commRevDate">
        <annotation>
          <appinfo source="http://www.wsadie.com/appinfo">
            <initialValue kind="SPACE"/>
          </appinfo>
        </annotation>
        <simpleType>
          <restriction base="string">
            <maxLength value="8"/>
          </restriction>
        </simpleType>
      </element>
      <element name="commDigest">
        <annotation>
          <appinfo source="http://www.wsadie.com/appinfo">
            <initialValue kind="SPACE"/>
          </appinfo>
        </annotation>
        <simpleType>
          <restriction base="string">
            <maxLength value="40"/>
          </restriction>
        </simpleType>
      </element>
    </sequence>
  </complexType>
  <element name="commHeader" type="cbl:commheader"/>
``` commHeader.xsd     FIG. 11

GENERATING REFERENCES TO REUSABLE CODE IN A SCHEMA

BACKGROUND OF THE INVENTION

1. Field of the Invention

The present invention relates to a method, system, and computer program product for generating references to reusable code in a schema.

2. Description of the Related Art

Legacy applications, such as a third generation programming languages (e.g., Common Business-Oriented Language (COBOL), etc.) may utilize COPYBOOK or other "include" mechanisms to re-use data declarations for multiple programs or functions. The reusable sequences of code are placed into "COPY" files ("copybooks") and achieve re-use by including the same copybook in multiple source files via the COBOL COPY statement. (Similar mechanisms are used in Java, C/C++ and other procedural languages.) The most typical sequence of code to re-use in COBOL is a data definition that repeats in multiple data structures.

Figure 1A:
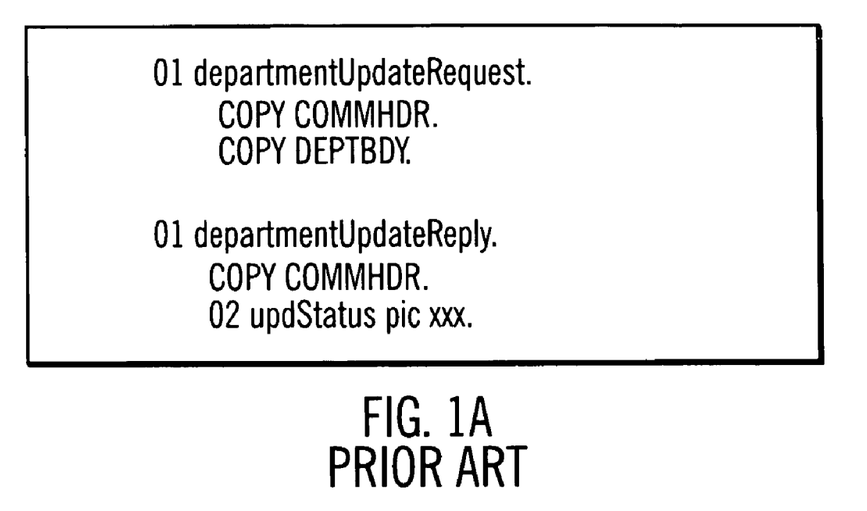
FIGS. 1a and 1b illustrates a prior art example of code including a reference to reusable code and the reusable code.
Figure 1B:
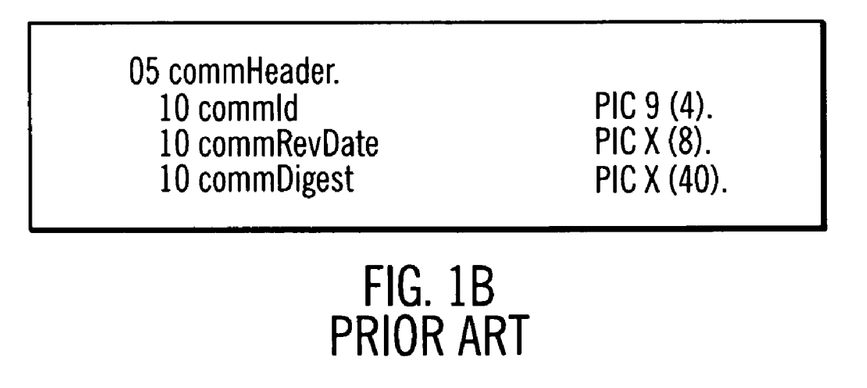

FIG. 1a illustrates an example of two data structure definitions departmentUpdateRequest and departmentUpdateReply that may be included in a COBOL program, re-using the same copybook named COMMHDR. The COMMHDR copybook file would contain the reusable code. FIG. 1b illustrates an example of the reusable code in the COMMHDR copybook file.

A data modeling tool may generate Extended Markup Language (XML) schema equivalents of the COBOL copybooks. Such tools are used to expose COBOL legacy interfaces as services in a Service Oriented Architecture. These tools include for example, Rational Developer for System z (RD/z) Enterprise Service Tools components and CICS Transaction Server (CICS TS) Web Services Assistants. Then data modeling tools may generate an XML schema, such as an XSD file, for the different data structures in the COBOL program, such as the departmentUpdateRequest and departmentUpdateReply data structures, providing elements, attributes, and definitions of the data structures in the XML schema (XSD). The purpose of expressing the COBOL data structures as XML schemas is to expose their definitions and data to other systems and environments to provide non-COBOL systems and environments access to the data structures in the COBOL programs.

Figure 2:
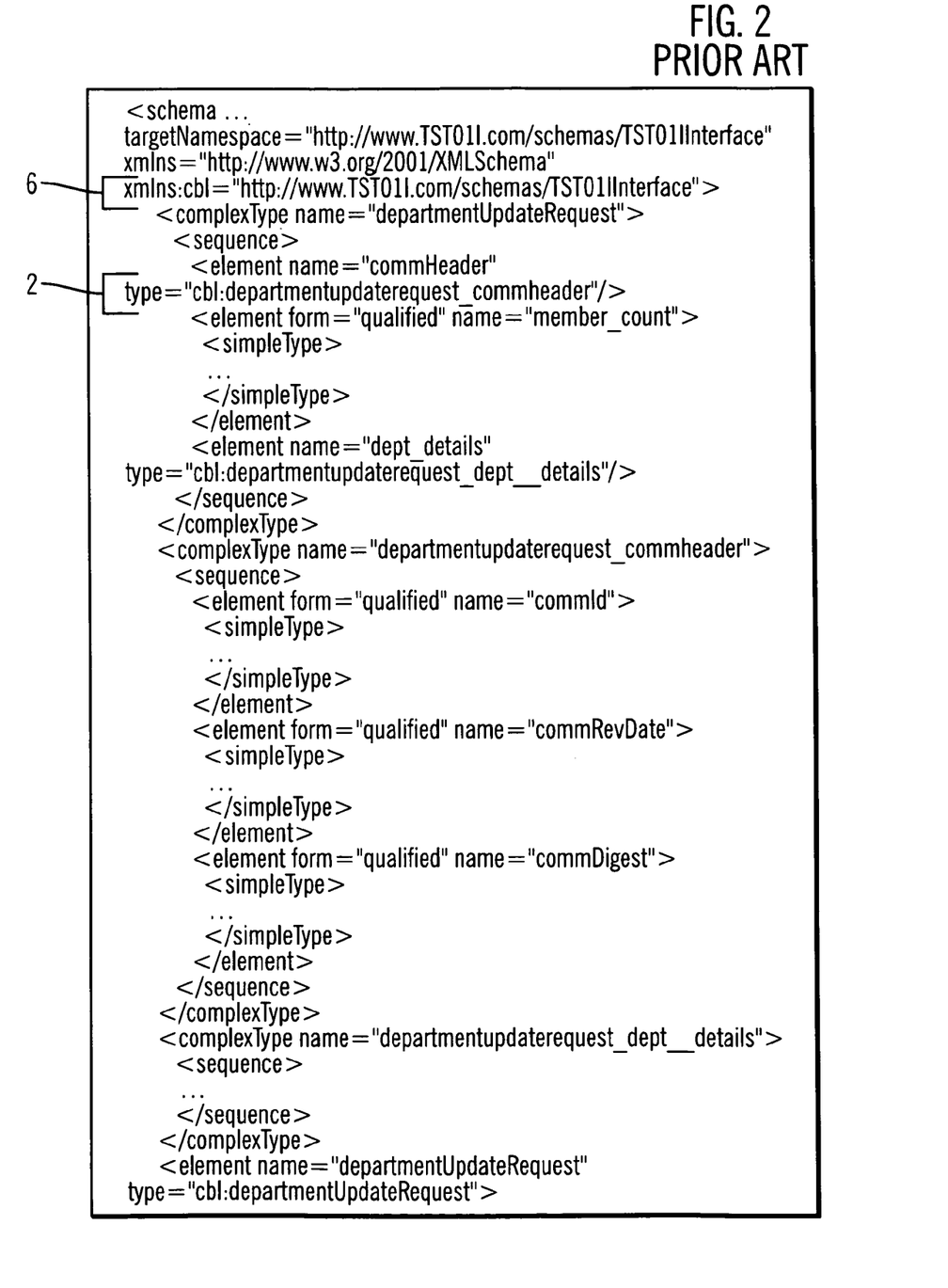
FIGS. 2 and 3 illustrates examples of how the data structures of FIG. 1 are generated into schemas in a manner known in the prior art.
Figure 3:
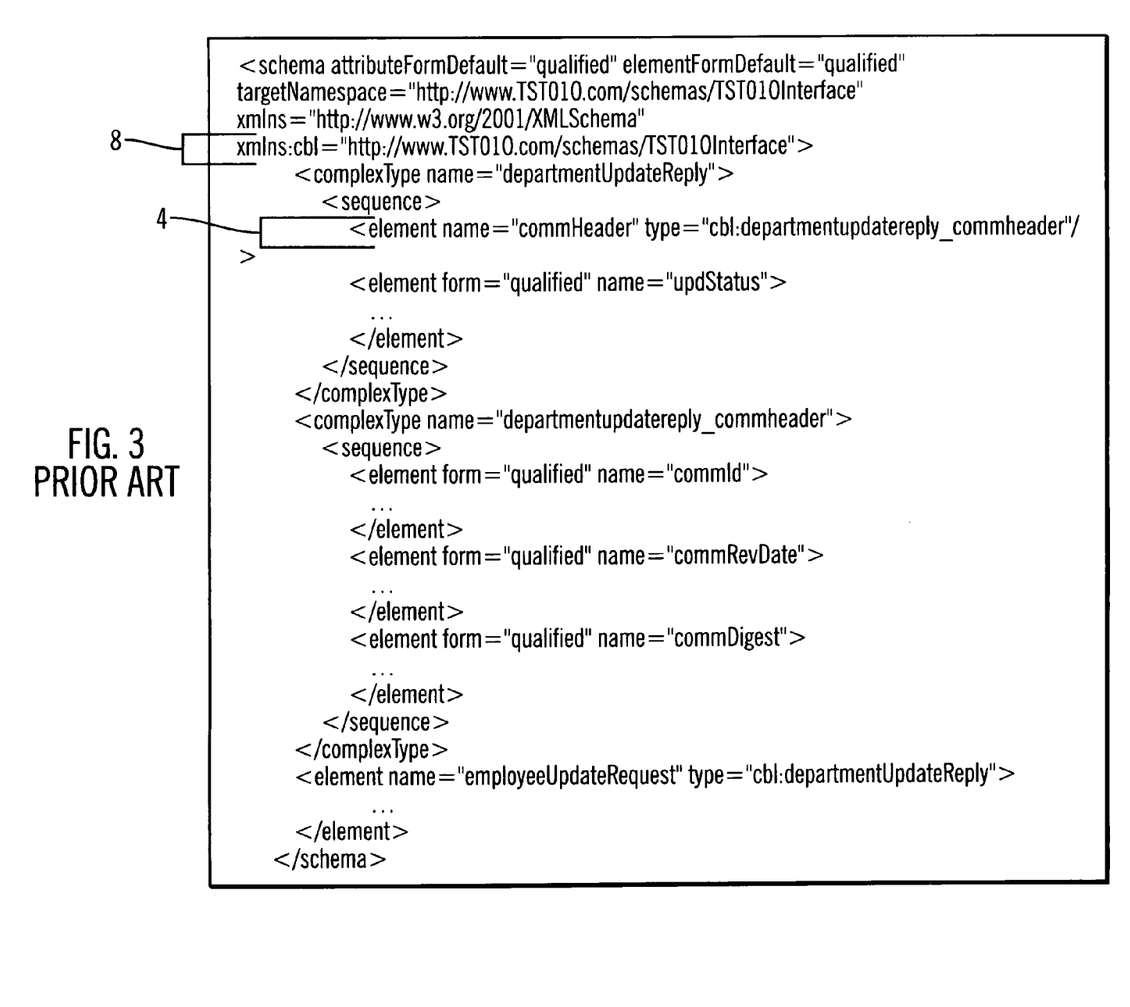

FIG. 2 illustrates an example of a schema generated for the departmentUpdateRequest data structure and FIG. 3 illustrates an example of a schema generated for the departmentUpdateReply data structure. Both of the schemas in FIGS. 2 and 3 include a declaration for the copybook element commHeader at statements 2 and 4, respectively, and a declaration for the namespace for the schemas for the copybook elements 6 and 8, respectively. In these examples, the differences in generation of the commHeader statement in the XML schema for the different data structures is the complex type name for each element as shown at reference numerals 2 and 4 in FIGS. 2 and 3, respectively, ("departmentupdaterequest_commheader" versus "departmentupdatereply_commheader") and the namespaces for the schemas as shown at reference numerals 6 and 8 ("xmlns:cbl="http://www.TST01I.com/schemas/TST01IInterface" versus "xmlns:cbl=http://www.TST01O.com/schemas/TST01OInterface).

Because a single copybook can be used in multiple data structure definitions, the current schema generators duplicate different typed elements for the copybook schemas in the different data structures, which expresses the copybook schema definitions as non-reusable, because their schema expression differs between data structures.

There is a need in the art for improved techniques for generating schemas for programs having data structures including references to reusable code.

SUMMARY

Provided are a method, system, and computer program product to generate references to reusable code in a schema. A program coded in a first programming language has data structures, wherein at least one of the data structures includes a reference to reusable code. A model file is generated providing a source name identifying the reusable code, elements and attributes in a second programming language for the reference to the reusable code in the program. A generator is invoked with a reference to the model file. The invoked generator processes the data structure coded in the first programming language to generate a data structure schema in a second programming language describing elements and attributes of the data structure coded in the first programming language. A determination is made of instances of the source name indicated in the model file in the data structure. For the determined instances of the source name in the data structure, a reference in the data structure schema to the reusable code identified by the source name is generated, wherein the reference generated in the data structure schema includes the element and attribute information indicated in the model file.

In further embodiments, generating the reference comprises an import statement generated into the data structure schema in the second programming language including the element and attributes indicated in the model file.

In further embodiments, the generator is invoked to generate multiple data structure schemas in the second programming language for multiple data structures coded in the first programming language, wherein the same generated reference to the reusable code is included in the multiple schemas.

In further embodiments, the model file is generated from a metamodel file.

In further embodiments, a common type schema is generated in the second programming language providing elements and attributes describing the reusable code in the data structure, wherein the reference to the reusable code in the data structure schema identifies the common type schema and a location of the common type schema.

In further embodiments, the reusable code in the data structure is contained within a reusable code file in the first programming language that is capable of being referenced in multiple data structures in the first programming language, and wherein a schema generator generates the common type schema from the reusable code file.

In further embodiments, the model file is validated against the common type schema, wherein the generator is invoked in response to validating the model file.

In further embodiments, a command prompt including a call to the generator having a parameter identifying the model file to invoke the generator is processed.

In further embodiments, a script file including references to at least one model file to invoke the generator is processed, wherein the generator determines instances of the source name in the program for each model file referenced in the script file, and wherein the generator generates for each determined instance of each source name the reference in the program schema to the reusable code corresponding identified by the source name.

DETAILED DESCRIPTION

Figure 4:
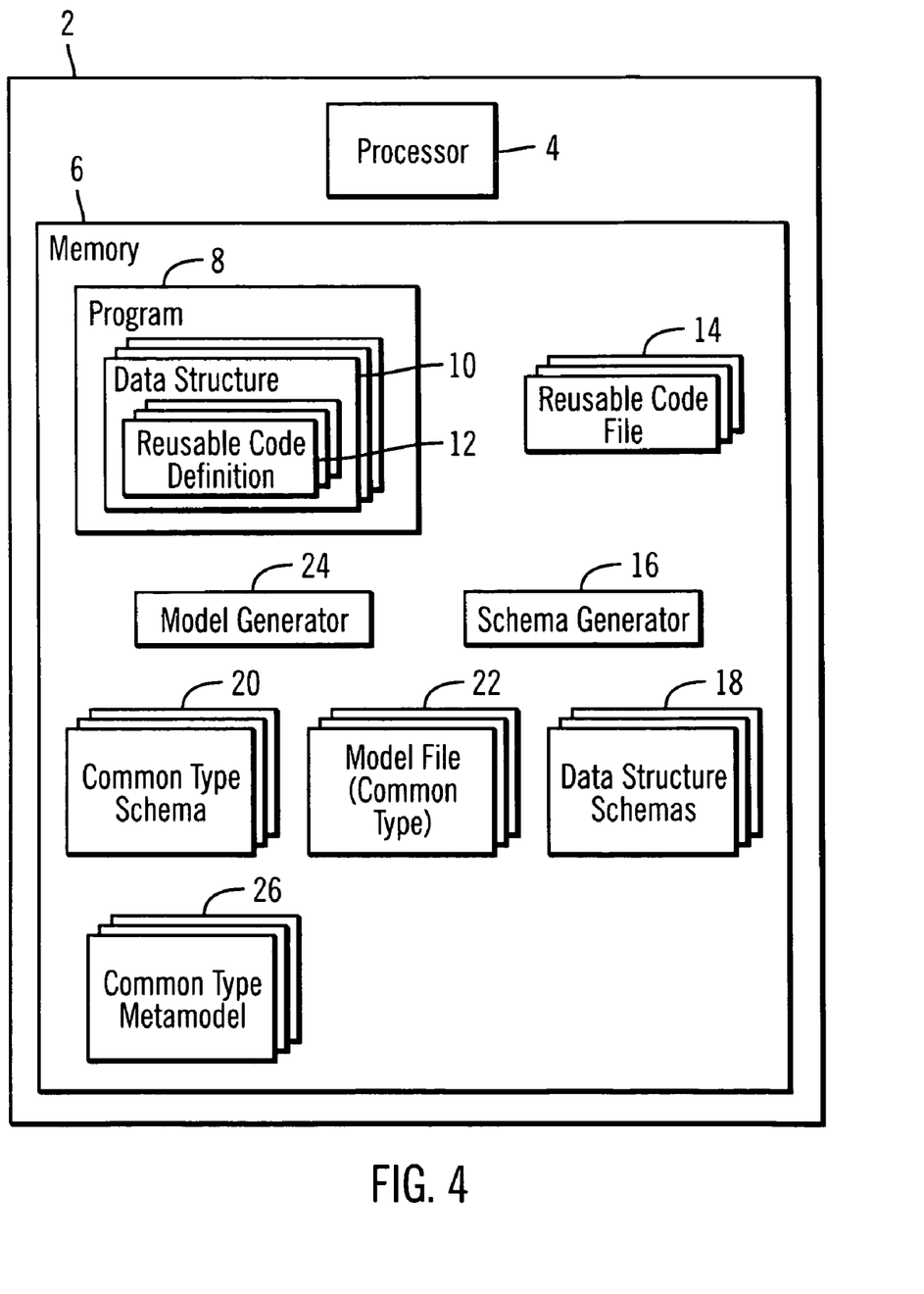
FIG. 4 illustrates an embodiment of a computing environment.

FIG. 4 illustrates an embodiment of a computing environment including a computer system 2 having a processor 4 and a memory 6 which includes program components executed by the processor 4. The memory 6 includes a program 8 in a first programming language, such as a legacy programming language, e.g., COBOL, having data structures 10, where one or more of the data structures 10 may include a reference one or more reusable code definitions 12. The reusable code definitions 12 point to their respective reusable code file 14 having the code to reuse or include in the different data structures 10. For instance, if the program 8 is written in the COBOL language, then the reusable code definitions may comprise a reference to a reusable code file 14 in the form of a copy file or copybook. In different programming languages, different techniques may be used to implement the reusable code definition and reusable code file 14 referenced in multiple data structures 10.

A schema generator 16 processes the data structures 10 to generate a data structure schema 18 for each processed data structure 10. The schema generator 16 may also process the reusable code files 14 to generate a common type schema 20 for the reusable code files 14. A model generator 24 may generate from a metamodel 23 a model file 22 having information used to generate the references for the reusable code definitions 12 in the program 8, which the schema generator 16 then includes in the data structure schema 10 providing metadata and elements and attributes describing the data structures 10 in a second programming language different from the first programming language in which the program 8 is coded. For instance, the schemas 18, 20 may comprise XML schemas stored as XSD files. The common type metamodel file 26 providing a metamodel for a common type model file 22 may comprise a schema that can be used for generating or validating the common type model. The model file 22 may comprise an XML file that is used to direct the schema generator 16 to use common types, elements, namespaces, etc., when generating the data structure schema 18 from the data structures 10 in the first programming language. Alternatively, the model file 14 may be manually coded using a word processor or software development tool.

The schema generator 16 may include the functionality of model-driven code generation tools that generate schemas, such as XML schemas, from source code, such as COBOL, and include additional functionality of the described embodiments.

Figure 5:
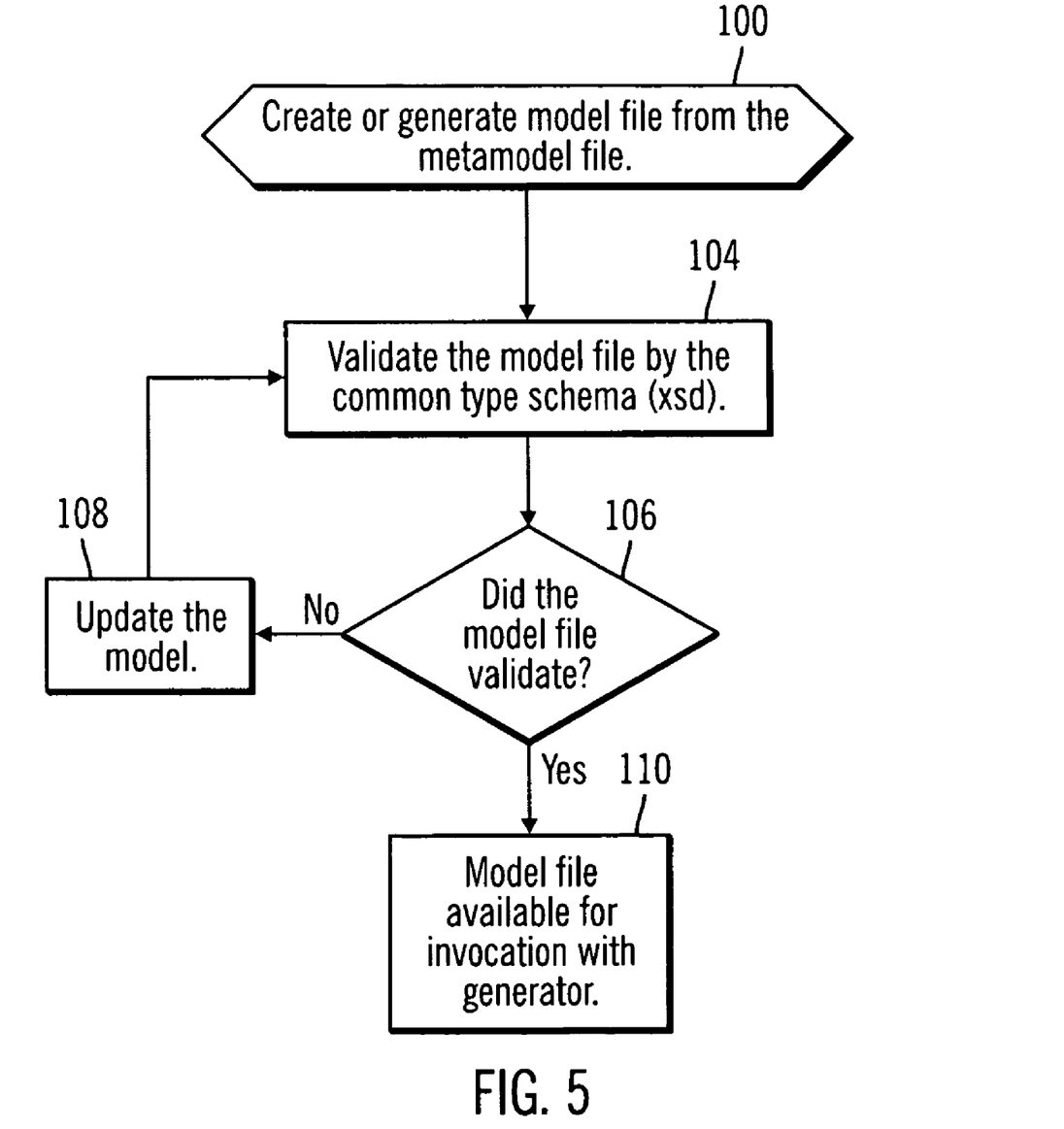
FIG. 5 illustrates an embodiment of operations to generate a common type schema and model file.

FIG. 5 illustrates an embodiment of operations performed by the model generator 24 to create the model file 22. At block 100, the model file 22 is created (or generated from the metamodel file 23) The model file 22 may then be validated (at block 104) by the metamodel file 22. If (at block 106) the model file 22 is validated, then the model file 22 is available (at block 110) for invocation with the schema generator 16. If the model file 22 is not validated, then the user needs to update (at block 108) the model file 22 and then return to block 104 to re-validate the updated model file 22.

Figures 6, 7:
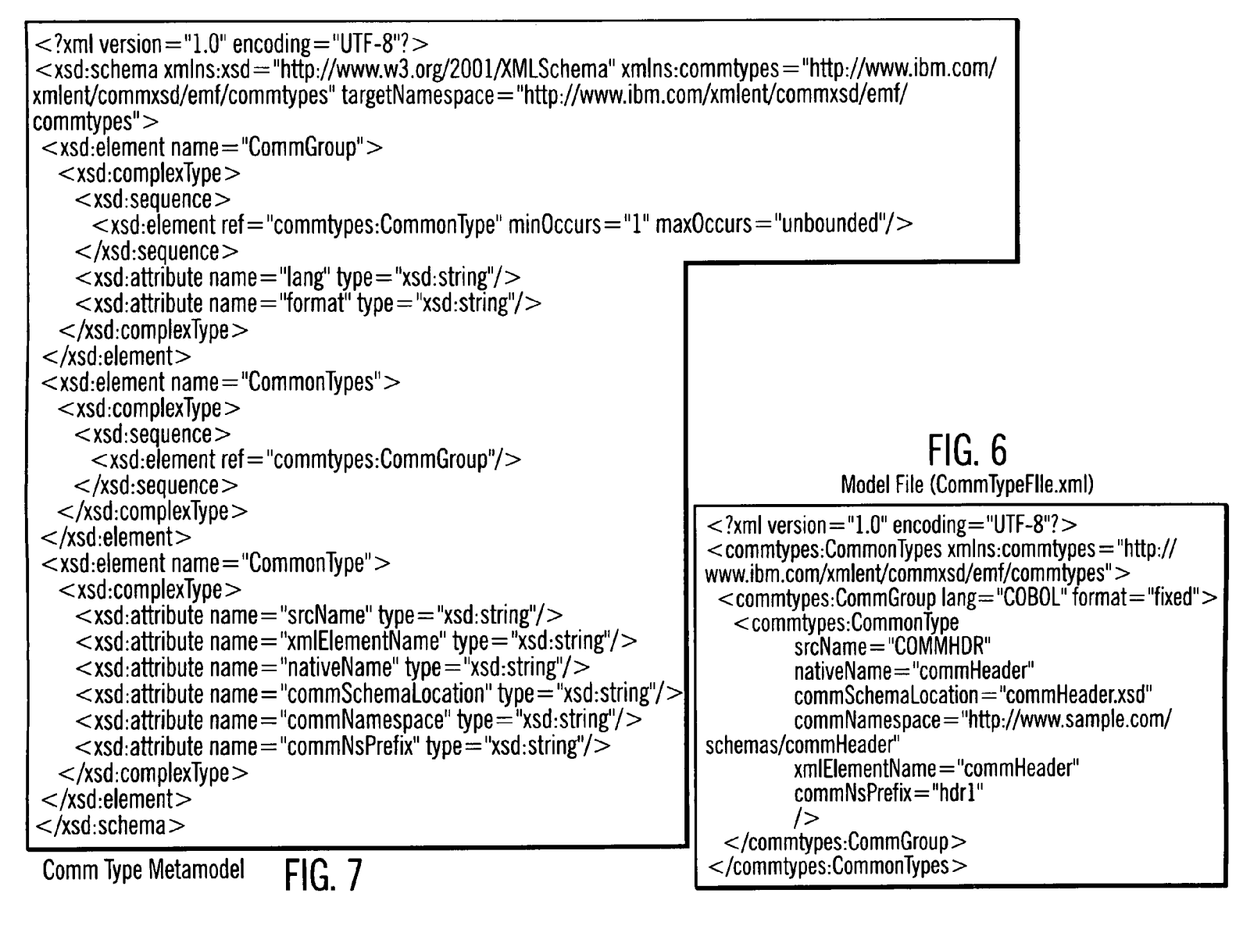
FIG. 6 illustrates an example of a model file generated according to described embodiments.
FIG. 7 illustrates an example of a metamodel according to which a model file as shown in FIG. 6 can be generated.

FIG. 6 provides an example of the element and attribute information included in the model file 22 (XML file) on a reusable code file 14. The elements and attributes of the model file 22 as presented in FIG. 6 may include:

CommTypes: Container element for common groups.

CommGroup: Group for listing common type information

Lang: Specifies source language of the application source being processed.

Format: For source languages that permit fixed or free source formatting, this attribute must specify which format is used.

CommonType: Attributes of this element describe how the common application source data items should be processed (see below).

srcName: Specifies source name of the copybook as it appears in the COBOL application program source.

nativeName: Specifies COBOL data item name for which the XML schema reference and type should be taken from the common schema commSchemaLocation: Specifies common schema location attribute (xsi:schemaLocation) that will be generated in the import statement for the enclosing WSDL or XSD.

commNamespace: Specifies value of the namespace declaration that will be generated for referring to the common schema.

xmlElementName: Specifies the value of the element name from the common schema that should be referred to from the enclosing WSDL or XSD.

commNsPrefix: Specifies value of the namespace prefix that should be generated to qualify the reference of the common elements and types.

FIG. 7 provides an example of a metamodel file 23 comprising a metamodel and schema of the reusable code definition 12, which is described in the model file 22.

Figure 8:
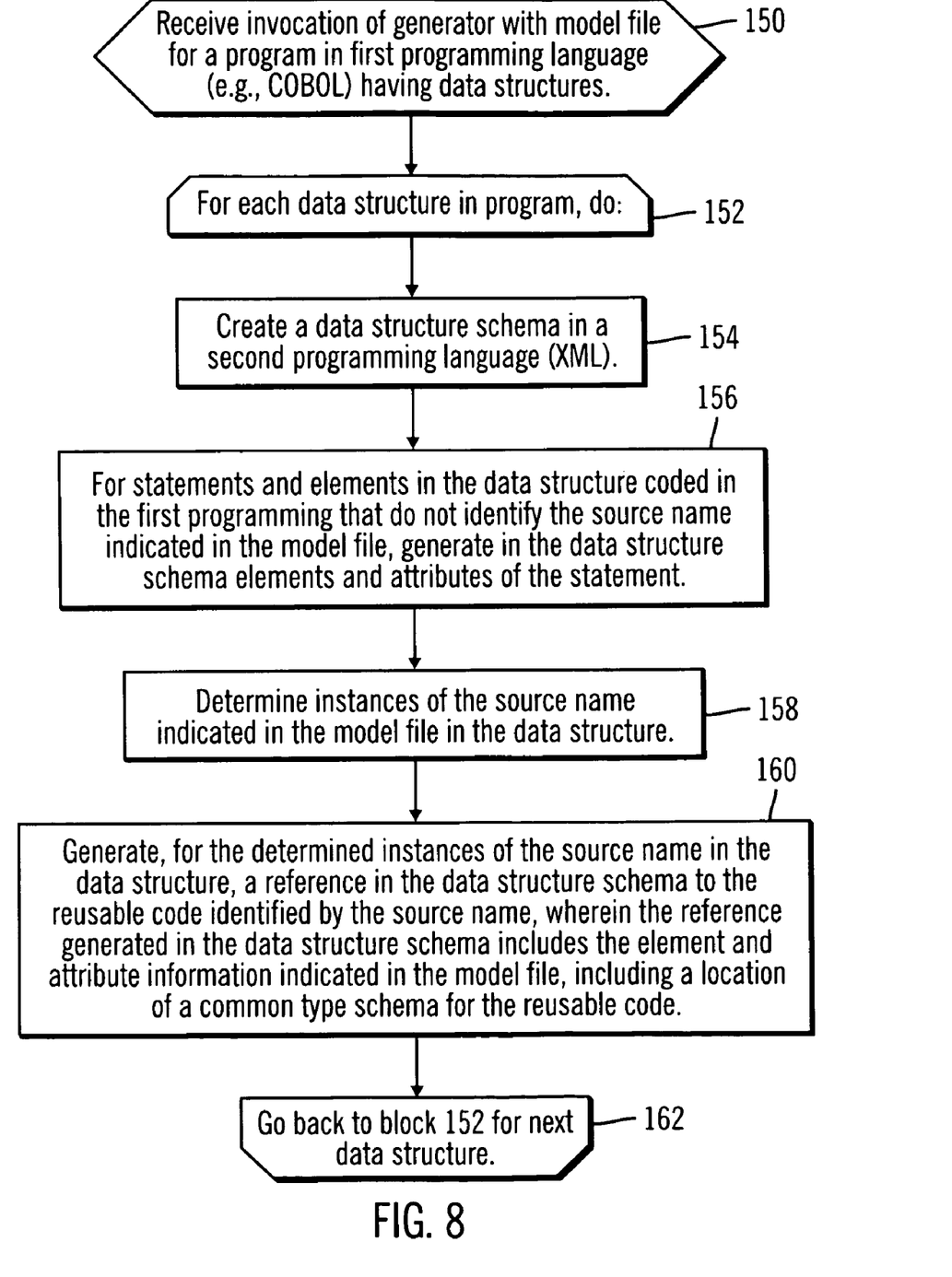
FIG. 8 illustrates an embodiment of operations to generate a schema from a model file.

FIG. 8 illustrates an embodiment of operations performed by the schema generator 16 upon being invoked to generate a data structure schema 18 for a data structure 10 in the program 8. The schema generator 16 is invoked (at block 150) with a model file 22 for a program 8 in first programming language (e.g., COBOL) having data structures 10. In certain embodiments, the schema generator 16 may be invoked to process the entire program 8 or selected data structures 10 within the program 8. If the entire program 8 is selected for processing, then the schema generator 16 performs a loop of operations at blocks 152 through 162 for each data structure 10 in the program 8. For each data structure 10, the schema generator 10 creates (at block 154) a data structure schema 18 file in a second programming language such as XML, which may form an XML schema (XSD file). For statements and elements in the data structure 10 coded in the first programming language that do not identify the source name (e.g., srcName) indicated in the model file 22, which is the name of the reusable code definition 12 in the program 8, the schema generator 16 generates (at block 156) in the data structure schema 18 elements and attributes in the second programming language (e.g., XML) for the of the statements and elements in the first programming language (e.g., COBOL). The schema generator 16 determines (at block 158) instances of the source name of the reusable code definition 12 indicated in the model file 22 in the data structure 10. The schema generator 16 generates (at block 160), for the determined instances of the source name of the reusable code definition 12 in the data structure 10, a reference in the data structure schema 18 to the reusable code identified by the source name. The reference for the reusable code definition 12 generated in the data structure schema 18 includes the element and attribute information indicated in the model file 22, including a location of the common type schema 20 for the reusable code, e.g., commSchemaLocation, the namespace of the common type schema 20, e.g., commNamespace, etc.

Figure 9:
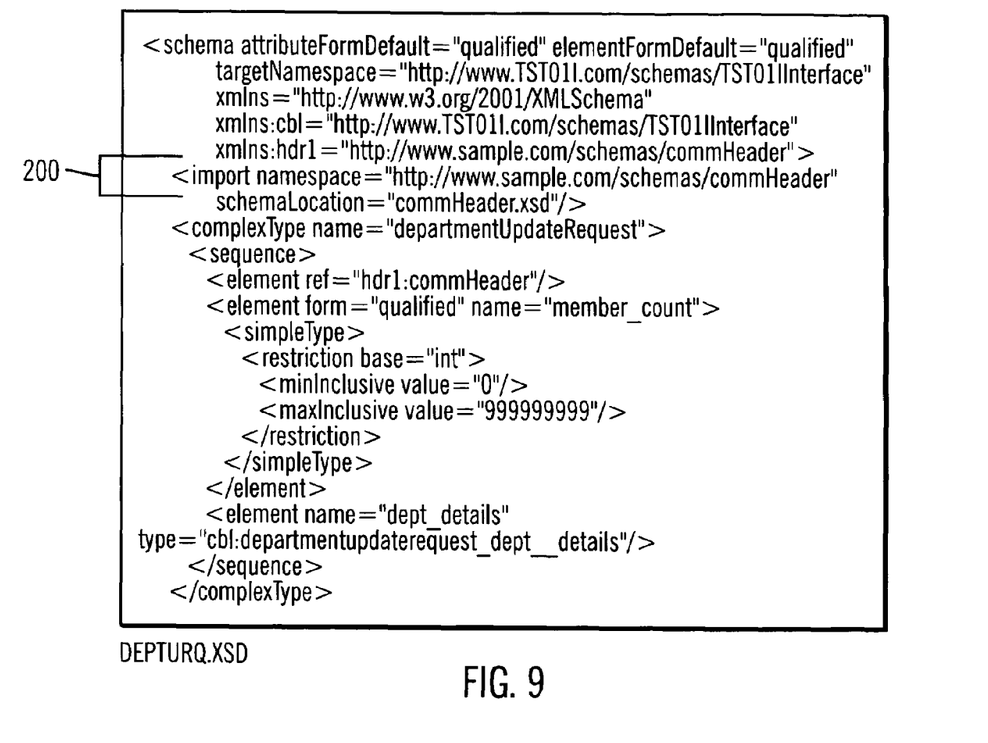
FIGS. 9 and 10 illustrate examples of data structure schemas generated according to the operations of FIG. 8.
Figure 10:
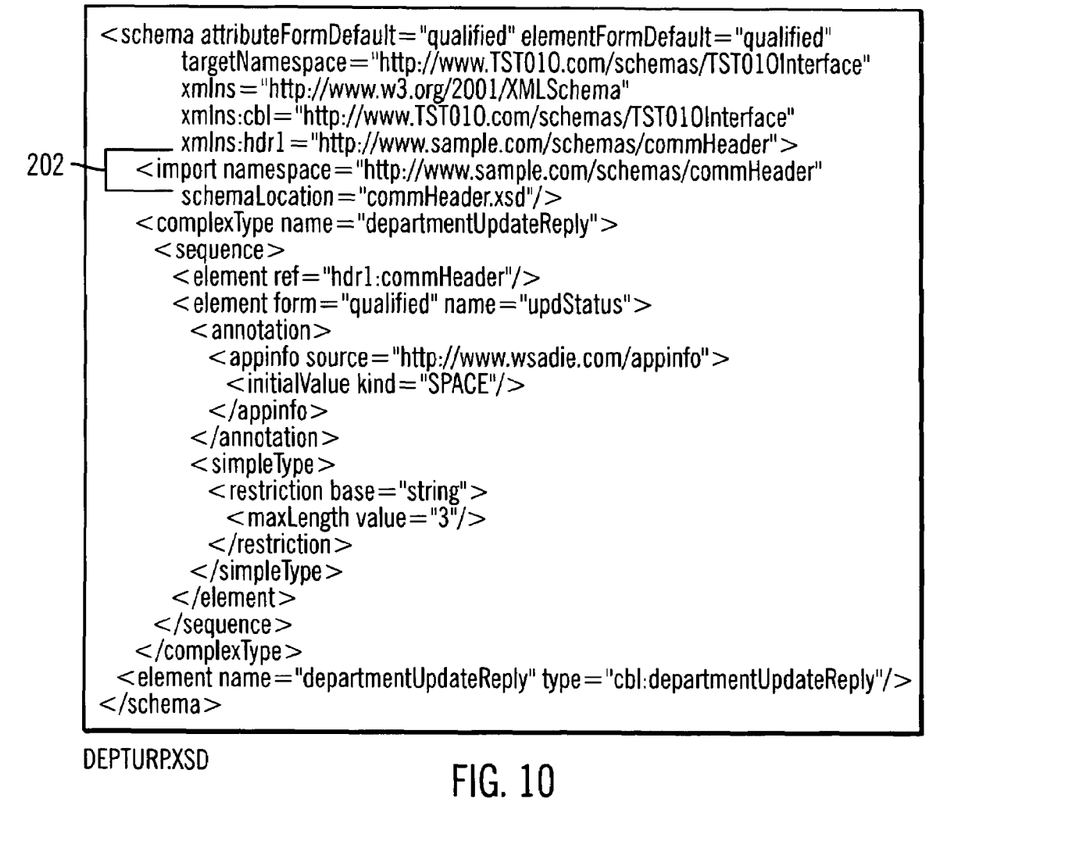
Figure 11:
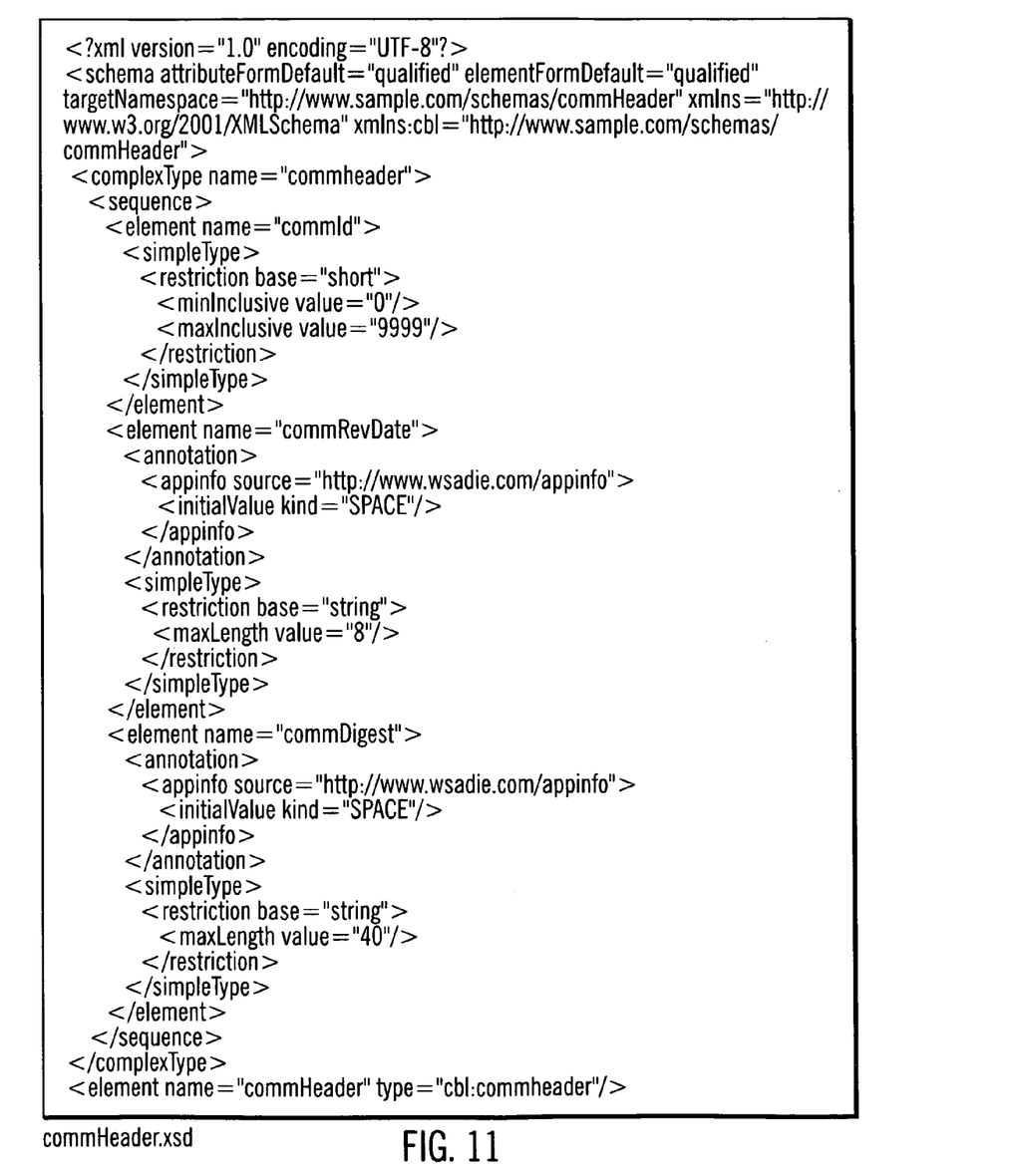
FIG. 11 illustrates an example of the schema for the reusable code.

In one embodiment, the reusable code may be referenced in the data structure schema 18 through the use of an import statement as shown in FIGS. 9 and 10. FIG. 9 provides an example of common type schema 20 for the previously discussed departmentUpdateRequest data structure, stored in an XSD file named DEPTURQ.XSD. FIG. 10 provides an example of common type schema 20 for the previously discussed departmentUpdateReply data structure, stored in an XSD file named DEPTURP.XSD. The reference to the reusable code definition, named commHeader is through the import statements 200 and 202 in FIGS. 9 and 10, respectively. The common type schema 20 for the commHeader reusable code definition would be imported into the common type schema 20 when later generated. FIG. 11 illustrates an example of the common type schema 20 for the commHeader reusable code generated from the reusable code file 14.

In one embodiment, the schema generator 16 may process the statements in a data structure 10 line-by-line and convert statements to elements and attributes or convert statements in the program 8 comprising the source name of a reusable code definition to elements and attributes in the model file 22. Alternative techniques known in the art may further be used to perform the transformation of the statements.

In one embodiment, the schema generator 16 may be invoked using a command line interface including a call to the schema generator 16 and a parameter comprising the model file 22 to provide the elements and attributes for the schema generator 16 to use when referencing the reusable code definition in the data structure schema 16. Alternatively, the schema generator 16 may be invoked in a script file that references one or more model files 22 to allow the scheme generator 16 to generate common references for multiple reusable code definitions 12 in the program 8. In this way, the schema generator 16 generates for each determined instance of each source name in the data structures 10 of the program 8 the reference in the data structure schema 18 to the common type schema 20 for the reusable code identified by the source name in the program 8.

With the described embodiments, the same reference is used for the reusable code when generating the schemas for different data structures by providing the schema generator 16 a model file 22 that instructs the schema generator 16 on common elements and attributes to use for the reference to the reusable code definition 12 in the data structure schema 10. This ensures that the reference to the reusable code definition and common type schema for the reusable code definition in different data structure schemas remains the same to provide for reusability of the reusable coded. This avoids the situation where the schema generator 12 may generate data structure specific references to the reusable code definition that are different in each data structure schema.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/ or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 5 and 8 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method, comprising:
providing a program coded in a first programming language having data structures, wherein at least one of the data structures includes a reference to reusable code;
generating a model file providing a source name identifying the reusable code, elements and attributes in a second programming language for the reference to the reusable code in the program;
invoking a generator with a reference to the model file;
processing, by the invoked generator, the data structure coded in the first programming language to generate a data structure schema in a second programming language describing elements and attributes of the data structure coded in the first programming language;
determining instances of the source name indicated in the model file in the data structure; and
generating, for the determined instances of the source name in the data structure, a reference in the data structure schema to the reusable code identified by the source name, wherein the reference generated in the data structure schema includes the element and attribute information indicated in the model file.

2. The method of claim 1, wherein generating the reference comprises an import statement generated into the data structure schema in the second programming language including the elements and attributes indicated in the model file.

3. The method of claim 1, wherein the generator is invoked to generate multiple data structure schemas in the second programming language for multiple data structures coded in the first programming language, wherein the same generated reference to the reusable code is included in the multiple schemas.

4. The method of claim 1, wherein the model file is generated from a metamodel file.

5. The method of claim 1, further comprising:
generating a common type schema in the second programming language providing elements and attributes describing the reusable code in the data structure, wherein the reference to the reusable code in the data structure schema identifies the common type schema and a location of the common type schema.

6. The method of claim 5, wherein the reusable code in the data structure is contained within a reusable code file in the first programming language that is capable of being referenced in multiple data structures in the first programming language, and wherein a schema generator generates the common type schema from the reusable code file.

7. The method of claim 5, further comprising:
validating the model file against the common type schema, wherein the generator is invoked in response to validating the model file.

8. The method of claim 1, further comprising:
processing a command prompt including a call to the generator having a parameter identifying the model file to invoke the generator.

9. The method of claim 1, further comprising:
processing a script file including references to at least one model file to invoke the generator, wherein the generator determines instances of the source name in the program for each model file referenced in the script file, and wherein the generator generates for each determined instance of each source name the reference in the program schema to the reusable code identified by the source name.

10. A computer program product for processing a program coded in a first programming language having data structures, wherein at least one of the data structures includes a reference to reusable code, the computer program product comprising:
a computer readable storage medium having computer readable program code embodied therein, the computer readable program code configured to:
generate a model file providing a source name identifying the reusable code, elements and attributes in a second programming language for the reference to the reusable code in the program;
invoke a generator with a reference to the model file;
process, by the invoked generator, the data structure coded in the first programming language to generate a data structure schema in a second programming language describing elements and attributes of the data structure coded in the first programming language;
determine instances of the source name indicated in the model file in the data structure; and
generate, for the determined instances of the source name in the data structure, a reference in the data structure schema to the reusable code identified by the source name, wherein the reference generated in the data structure schema includes the element and attribute information indicated in the model file.

11. The computer program product of claim 10, wherein generating the reference comprises an import statement generated into the data structure schema in the second programming language including the elements and attributes indicated in the model file.

12. The computer program product of claim 10, wherein the generator is invoked to generate multiple data structure schemas in the second programming language for multiple data structures coded in the first programming language, wherein the same generated reference to the reusable code is included in the multiple schemas.

13. The computer program product of claim 10, wherein the model file is generated from a metamodel file.

14. The computer program product of claim 10, wherein the computer readable program code is further configured to:
generate a common type schema in the second programming language providing elements and attributes describing the reusable code in the data structure, wherein the reference to the reusable code in the data structure schema identifies the common type schema and a location of the common type schema.

15. The computer program product of claim 14, wherein the reusable code in the data structure is contained within a reusable code file in the first programming language that is capable of being referenced in multiple data structures in the first programming language, and wherein a schema generator generates the common type schema from the reusable code file.

16. The computer program product of claim 14, wherein the computer readable program code is further configured to:
validate the model file against the common type schema, wherein the generator is invoked in response to validating the model file.

17. The computer program product of claim 10, wherein the computer readable program code is further configured to:
process a command prompt including a call to the generator having a parameter identifying the model file to invoke the generator.

18. The computer program product of claim 10, wherein the computer readable program code is further configured to:
process a script file including references to at least one model file to invoke the generator, wherein the generator determines instances of the source name in the program for each model file referenced in the script file, and wherein the generator generates for each determined instance of each source name the reference in the program schema to the reusable code identified by the source name.

19. A system, comprising:
a memory;
a model generator executed in the memory to:
process a program coded in a first programming language having data structures, wherein at least one of the data structures includes a reference to reusable code; and
generate a model file providing a source name identifying the reusable code, elements and attributes in a second programming language for the reference to the reusable code in the processed program;
a schema generator executed in the memory to:
process the data structure coded in the first programming language to generate a data structure schema in a second programming language describing elements and attributes of the data structure coded in the first programming language;
determine instances of the source name indicated in the model file in the data structure; and
generate, for the determined instances of the source name in the data structure, a reference in the data structure schema to the reusable code identified by the source name, wherein the reference generated in the data structure schema includes the element and attribute information indicated in the model file.

20. The system of claim 19, wherein generating the reference comprises an import statement generated into the data structure schema in the second programming language including the elements and attributes indicated in the model file.

21. The system of claim 19, wherein the schema generator is invoked to generate multiple data structure schemas in the second programming language for multiple data structures coded in the first programming language, wherein the same generated reference to the reusable code is included in the multiple schemas.

22. The system of claim 19, wherein the schema generator is further executed to:
generate a common type schema in the second programming language providing elements and attributes describing the reusable code in the data structure, wherein the reference to the reusable code in the data structure schema identifies the common type schema and a location of the common type schema.

23. The system of claim 22, wherein the reusable code in the data structure is contained within a reusable code file in the first programming language that is capable of being referenced in multiple data structures in the first programming language, and wherein a schema generator generates the common type schema from the reusable code file.

24. The system of claim 22, wherein the model generator is further executed to:
validate the model file against the common type schema, wherein the generator is invoked in response to validating the model file.

25. The system of claim 19, wherein the schema generator is further executed to:
process a script file including references to at least one model file to invoke the generator, wherein the schema generator determines instances of the source name in the program for each model file referenced in the script file, and wherein the generator generates for each determined instance of each source name the reference in the program schema to the reusable code identified by the source name.

* * * * *